Sept. 24, 1963 F. J. HESTER 3,104,928
BATHKYMOGRAPH
Filed March 29, 1962 3 Sheets-Sheet 1

INVENTOR
FRANK J. HESTER
BY Ernest I. Cohen
Gersten Sadowsky
ATTORNEYS

Sept. 24, 1963  F. J. HESTER  3,104,928
BATHKYMOGRAPH
Filed March 29, 1962  3 Sheets-Sheet 2
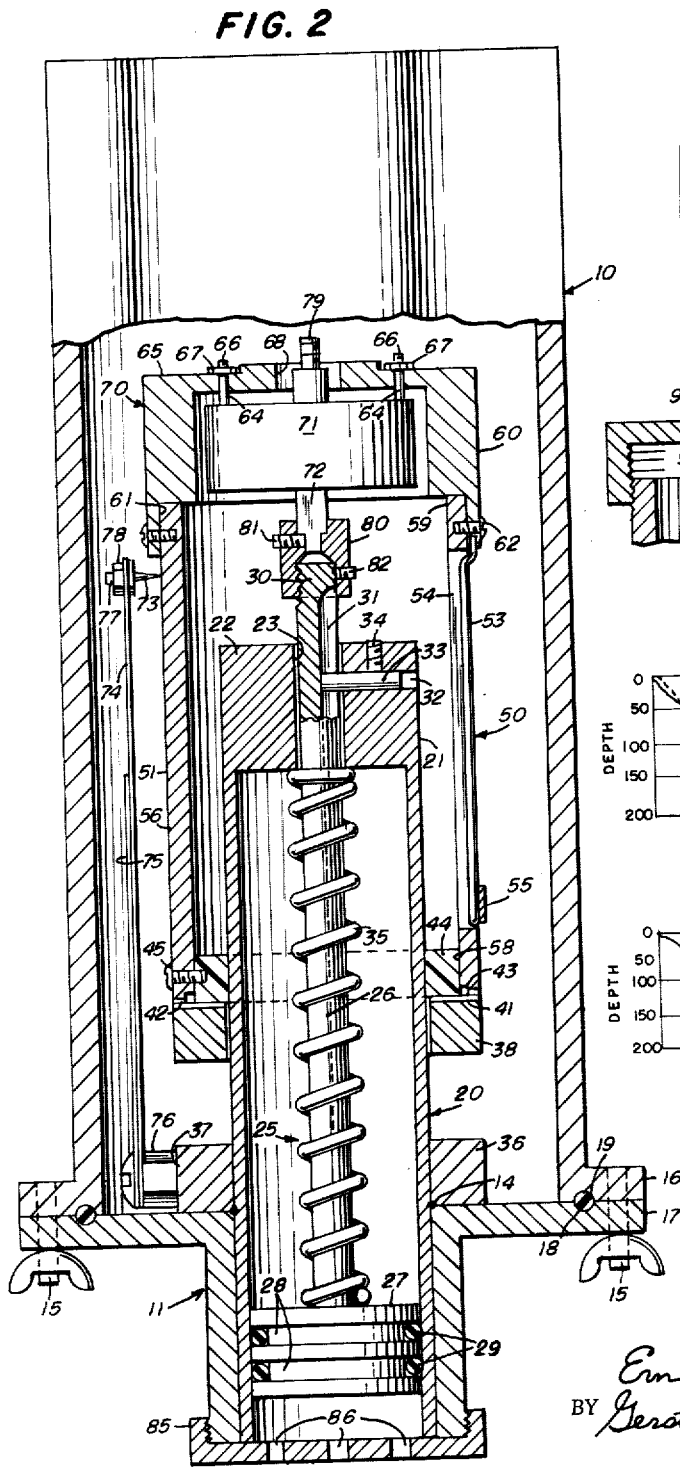
FIG. 2
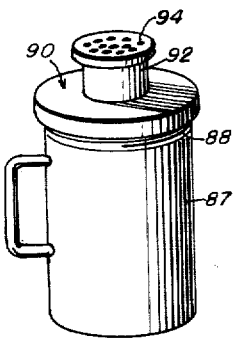
FIG. 3
FIG. 4
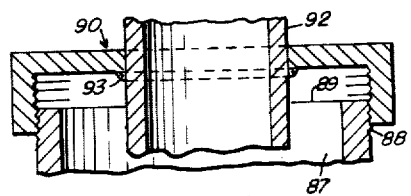
FIG. 5
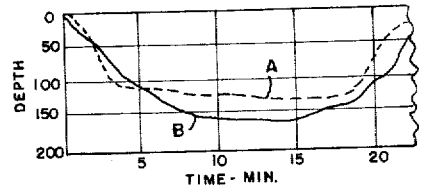
FIG. 6
INVENTOR
FRANK J. HESTER
BY Ernest J. Cohen
Gersten Sadowsky
ATTORNEYS Sept. 24, 1963    F. J. HESTER    3,104,928
BATHKYMOGRAPH Filed March 29, 1962    3 Sheets-Sheet 3

INVENTOR
FRANK J. HESTER
Ernest S. Cohen
BY Gersten Sakowsky
ATTORNEYS

United States Patent Office 3,104,928
Patented Sept. 24, 1963

3,104,928
BATHKYMOGRAPH
Frank J. Hester, San Diego, Calif., assignor to the United States of America as represented by the Secretary of the Interior
Filed Mar. 29, 1962, Ser. No. 183,682
17 Claims. (Cl. 346—72)
(Granted under Title 35, U.S. Code (1952), sec. 266)

The invention herein described and claimed may be manufactured and used by or for the Government of the United States of America for governmental purposes without the payment of royalties thereon or therefor.

This invention relates to a pressure sensing and recording mechanism, and more specifically to an instrument adapted for use in making a record of depth underwater corresponding to the pressure sensed, as a function of time. The instrument has particular utility for making a time based record of the depth reached by a net released or set from a fishing vessel. It also affords an excellent means of verifying predicted tidal extremes. When placed on the sea bottom just prior to an expected high or low tide, the instrument will record accurately both the extreme value and the time of its occurrence.

Knowledge of the depth reached by seines such as those used in commercial tuna fishing, aids importantly in the making of improvements in the design and operation of seines. One objective of such improvements would be to minimize the tuna's chances of escaping the seine. The operation of a seine in deep water leaves an avenue of escape for the fish, down under the leadline of the seine. It has been suggested that the depth and nature of the thermocline, the zone of transition from the warmer surface water to the cooler water of the depths, might determine whether or not a set of a seine will be successful, since the fish would not enter the cold water and would be trapped if the net goes deep enough to reach into or below the thermocline. The present invention makes available a unique tool to gage and record exactly the depth reached by the seine during a measured period of time, and is therefore most useful for testing the hypothesis about tuna response to thermocline. When applied for this purpose several of the instruments are attached at various places along the leadline for use on a net simultaneously, and ride overboard with the net as it is set. These instruments according to the present invention, start recording upon entering the water, and continue making a record of depth versus time until they are withdrawn from the water. With information as to the depth of the thermocline being determined from measurements read from a bathythermograph trace, it is possible to calculate the appropriate amount of "lead" required to allow the leadline to reach the thermocline before a moving school of fish reach the destination of the net. Knowing the speed of the fish, it is only necessary to determine the sinking time of the net to reach the thermocline, to calculate the requisite "lead." Records such as produced by the operation of the present invention, provide the necessary sinking time data.

An object of this invention is therefore to provide a pressure detecting recording instrument for use under water.

A further object of the invention is to provide a self-contained, easily utilized and maintained pressure recording instrument made operable to record automatically under water.

A still further object of the invention is to provide a compact and rugged underwater pressure recording instrument made operative to start recording by the pressure sensed underwater.

These and other objects, uses and advantages of this invention will become apparent from the following detailed description of one preferred embodiment of the invention, considered together with the accompanying drawings wherein:

FIG. 2 is a vertical sectional view through the instrument shown in FIG. 1;

FIG. 3 is a perspective view of the assembled instrument according to a second embodiment;

FIG. 4 is a vertical section through the top closure portion of the instrument illustrated in FIG. 3;

FIGS. 5 and 6 are graphical charts showing thereon typical curves, which are exemplary products of the operation of the present invention;

Figure 1:
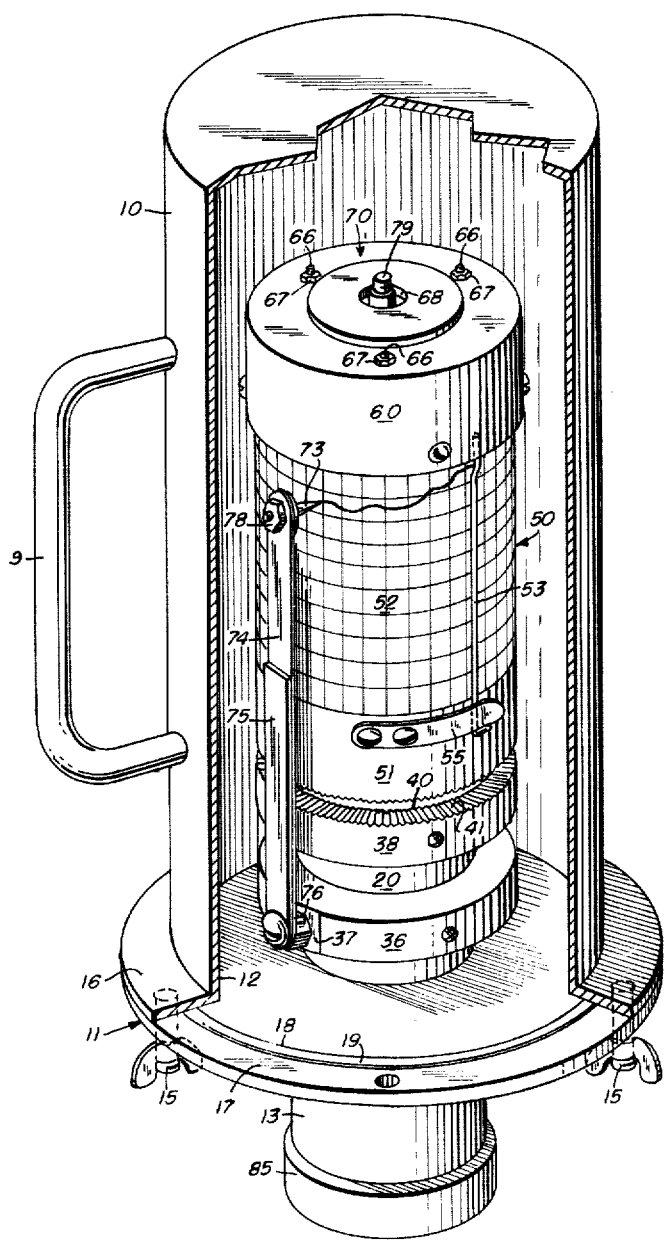
FIG. 1 is a perspective view of an instrument embodying the invention, illustrating a part of the internal mechanism of the instrument.

Referring first to FIG. 1, the apparatus of the invention may be seen as a conglomerate arrangement 1, spatially supported within an elongated cylindrical container 10, having an integral closure at one end. An external flange 16 on the container defines an opening 12, at its other end. A number of threaded studs fixed in the flange 16, and spaced about opening 12, are receivable in appropriately located holes in a covering disk 17 comprising part of a closure unit 11. Wing nuts operable on the studs 15, in a conventional way, are used to securely fasten the closure unit 11 to the container 10. Tightly fitted into a circular groove 18 on the outer face of disk 17, is found a rubber O-ring 19, in position to lie between the flange 16, and the outer face of the disk 17, when the closure unit is secured in place to effectuate a water-tight seal for the container 10. A handle 9, attached along the cylindrical wall of container 10, facilitates handling of the instrument when it is not in the water, and provides an attaching means for a lead line when its apparatus is made operable in the water. Aluminum, brass, and other similar corrosion-resistant metals and water impervious plastics, are suitable materials for fabricating the elements forming the outer protective shell of the present invention.

Among the structural elements constituting arrangement 1, which are shown in FIG. 1, is a piston housing 20 having within it a displaceable support for a recording assembly 50, and a clock mechanism assembly 70. This displaceable support is shown in detail in FIG. 2, to be a piston assembly 25, operable for longitudinal movement in the hollow tubular structure of the housing 20 which comprises a cylindrical wall 21, an open end 8, and a relatively thick end closure 22. A piston stem 26 of the assembly 25, extends outside the housing 20, through an axial bore 23 in the end closure 22. Surmounting the piston stem 26, is a piston head 27, suitably proportioned to obtain for it a sliding fit within the housing 20. Two intermediate reduced portions 28 on the piston head, have secured in them rubber O-rings 29, which act to seal off any by-pass of liquid around the piston head. At the end of the piston stem 26, outside the housing 20, is a stub 30, of reduced diameter, and provided with threads for a purpose to be hereinafter explained.

Again referring to FIG. 2, the piston stem 26 is seen to have a longitudinal slot or groove 31, extending along about three fourths of the stem length, starting from within the stub 30. A radial hole 32, through the cylindrical surface 21 and opening into the bore 23, receives a dowel pin 33, made of brass, a portion of which protrudes from the hole to enter well into the groove 31 in the piston stem. In a known manner a set screw 34 in a threaded hole through the outer face of end 22, contacts the pin 33 to fix it in its effective position. A steel coil spring 35, which is placed centrally about the piston stem 26, prior to inserting the piston assembly 25 into its housing 20, is maintained partially compressed between the inner faces of the piston head 27, and the housing end 22, when the assembly 25 is initially secured in place in housing 20. Other than for the sealing rings, and spring, all the housing and piston parts may be made of aluminum or other non-corrosive metal, or plastic materials such as would be used for the outer protective shell.

Made as an integral part with the disk 17 of the closure unit 11, is a cylindrical sleeve 13, which is fitted over a portion of the wall 21, of the housing 20 adjacent its open end 8. A silver solder joint 14 applied uninterruptedly around the periphery of the opening in disk 17, fixes the closure unit 11 to the cylindrical wall 21 of the piston housing. Also supported on the piston housing wall are two relatively thick collars 36 and 38, made of aluminum. Collar 36 in position next to the outer face of disk 17, is secured there by conventional set screws extending radially through the cylindrical wall of the collar. Removal of a short sector of this wall provides a flat surface 37 to which is fastened a support means for a recording stylus arrangement to be more fully explained hereinafter. Collar 38 is also provided with radial set screws whereby it is secured to the piston housing wall 21, at a predetermined distance from the collar 36. Covering a narrow band along the peripheral edge on the flat surface 40, constituting one side of the collar 38, are closely spaced radial ridges or milling 41, such as would be made by a knurling tool. As will be presently described, this knurled surface coacts with a similarly formed surface on an element of the recording assembly 50, to brake and hold from movement the recording assembly, and the clock mechanism assembly 70 connected therewith.

For the purpose of supporting a record material such as the graphical charts shown by FIGS. 5 and 6, for a co-operative relationship with the aforementioned recording stylus arrangement, the recording unit 50 comprises a drum 51, made of aluminum. FIG. 2 shows this drum to be a thin walled sleeve generally formed as a tubular element or hollow cylinder 56 of uniform diameter and wall thickness, the opposite ends of which define openings 58 and 59. Opening 58 of this tubular sleeve is more particularly defined by a rim 42, the thickness of which is reduced slightly from that of the sleeve's cylindrical wall, by a counterbore 43. Across the surface of this reduced thickness, and completely around the rim formed thereby, is a continuous band of closely spaced knurled ridges, constituting rim 42 as that element on the assembly 50, with which the knurled surface 41 on the collar 38, coacts. A bearing ring 44, made of plastic, or like material, is fitted within the opening 58 so as to be aligned with the circular bottom of the counterbore 43. This ring is secured in its place in the tubular sleeve by screws 45 fastened therein after passing through holes in the cylindrical wall of the sleeve. By fitting the bearing ring 44 to slide without play, upon the piston housing 20, it is made effective to prevent any lateral movement of the recording assembly 50, as well as to guide the assembly in its longitudinal movement.

As best seen in FIG. 1, a chart 52 selected to be marked by the stylus, is held in proper position on the drum 51, by means of a thin stainless steel retainer rod 53, having a short bent portion at one end, which coacts with a longitudinal slot 54 extending along the greater part of the length of the drum. The overlapped ends of the chart drawn about the drum, are slipped into the slot 54, and the rod 53 is fitted therein to retain the chart in place on the drum. A retainer spring 55, fastened by screws to a lower part of the drum surface, slips over and applies sufficient pressure on the rod to maintain it within the slot 54.

Recording assembly 50 is operatively related to the piston assembly 25, by means of the driving mechanism in the clockwork of assembly 70. Any conventional clockwork driving mechanism 71 would be suitable, and the selection of one to be used is made in accordance with the maximum operating time desired, which may range from 15 minutes to 28 days. Assembly 70, also includes a cylindrical aluminum cap 60, constituting the connective element between the clockwork mechanism 71 and the recording drum 51. The open end 61 of the cap is of sufficient diameter and depth to allow the cap to cover the opening 59 in the recording drum by merely slipping down over the related end portion of the cylindrical wall defining this opening in the tubular element 56. Small holes spaced around the rim of the cap adjacent opening 61, receive machine screws 62 which are adapted to engage within threaded holes appropriately located around the tubular sleeve 56, whereby the cap is positively joined to the drum. Beyond the opening 61 of the cap, is a slightly smaller opening 63, providing a chamber within which the cap receives the clockwork mechanism 71. Short rod-like elements 64 extending out of the support frame of the clockwork mechanism are received in small holes in the closed end 65 of the cap 60. Threaded stub portions 66 on the ends of elements 64, protrude out from the outer surface on end 65, and receive thereon suitable nuts 67 which are tightened to secure the clockwork mechanism 71 to the cap. A further hole 68 through the center of cap end 65, is provided for receiving therethrough the winding stem 79 of the clockwork mechanism. Piston stem 26 is joined to the clockwork mechanism 71, by means of a coupling sleeve 80. A threaded hole within one end of sleeve 80, receives for engagement therewith, the threads on the piston's stub 30, and within the other end of sleeve 80, a squared recess is in position to receive a matching squared portion of the clockwork's output spindle 72. A pair of set screws 81 and 82, appropriately placed in threaded holes of the coupling sleeve, insure that the critical connection accomplished therein is maintained intact during operation.

It is now evident from the construction hereinbefore described, that when recording drum 51 is free to move, the drive potential of the clockwork 71 is made effective to rotate it. This is accomplished through the assembly's connection with the clockwork support frame and consequently with the drive mechanism therein which will itself be driven about the rotationally inhibited clockwork spindle part 72. As is evident from the showing of FIG. 2, part 72 is prevented from rotating by reason of its unyielding connection in coupling 80, with the stem of the piston assembly 25, which in turn is held from rotation by pin 33 in its groove 31.

A graphical representation is produced on the chart 52 properly held in place on the drum 51 when the latter moves the chart past a fixed stylus means 73, pressed against the chart. This chart may be made of paper treated with a thin coat of wax or plastic in which the stylus may cut a distinct trace. Supporting structure for the stylus includes a thin flat elongated arm 74 made of spring steel, backed up and tensioned by a shorter arm 75 of the same material, both of which are attached to the flat surface 37 of the collar 36, by a hexagonal bracket 76. A threaded stem on one face of the bracket connects the bracket to the collar 36, and a corresponding threaded hole in its opposite face receives a screw for attaching the arms 74, 75, to the bracket. Means 73 comprising the stylus, may be a pointed phonograph needle soldered into a collar and threaded stem 77. The stylus point is suitably positioned relative to the drum 51, by securing the stem 77 in a hole at the far end of arm 74 with a nut 78, the point being effectively applied against the chart 52, by the tensioned arm 75.

A breather cap 85, provided to cover over the open end 8 of the housing 20, is fastened to the outer sleeve 13 on the housing, by either screw threads in the collar of the cap and on the sleeve, or by means of screws passing through holes in the top of the cap and into the rim of the sleeve. An arrangement of a plurality of small holes 86 in the top of the cap, allows passage of water into the space above the piston head 27, when the apparatus is made operative.

The structure for enclosing the conglomerate arrangement 1, may also be formed in the manner shown as an alternative embodiment in FIGS. 3 and 4. For this construction, an elongated cylindrical container 87 is equipped with threads 88 cut on its outside wall adjacent a top opening 89. A closure is provided in the form of a cap 90 internally threaded at 91 to engage the threads 88 on the wall of the container, whereby the cap may be retained on the container by a water-tight fit. A pipe-like structure 92, whose function corresponds to that of the piston housing 20 in the FIGS. 1 and 2 embodiment, is shown in the alternative form as extending through an axial hole in the cap 90, and fixed therein by welding seams 93 around the opening. A breather cap 94, in the nature of that previously described for element 85, is secured to the top of this form of the piston housing using screws or other threaded connections in a conventional way.

Operation of the instrument of the present invention produces graphical exhibits like those shown by the charts of FIGS. 5 and 6. Such graphs make available a continuous time based record of the depth under water of the instrument and therefore of a net to which it is attached by means of the net leadline. Recording starts from the time the instrument enters the water riding overboard with the leadline as the net is set. To accomplish this recording, the chart 52 as shown in FIG. 1 is made fast to the drum 51 by means of the rod 53, and the retainer 55 in the manner already described. As noted previously, the initial setting of the instrument finds the knurled surface of the drum rim 42 in firm contact with a similar knurled surface 41 on the collar 38. Although clockwork mechanism 71 is at this time fully wound with a potential to function as a drive, the drum assembly 50, and the parts connected thereto, do not move. Since the initial action of the coil spring 35 tends to drive the piston assembly 25 toward the breather cap, stem 26 of the piston assembly acts accordingly to draw with it the connecting coupler 80, the clockwork 71 fastened thereto, and through the intermediary of the cap 60, the drum assembly 50, which in turn engages its knurled surface 42, with the breaking surface 41. Stylus means 72, resting with appropriate pressure on the zero point in an upper corner of the chart, can therefore make no recording until the drum 51 is released from the breaking action caused by the engaged knurled surfaces.

As soon as the instrument enters the water, the cavity above the piston head 27 starts to fill with water coming through the holes in the breather cap. The instrument being of near neutral buoyancy itself, is pulled down with the sinking net, and the force of water pressure is quickly effective on the piston head 27, to cause it to compress spring 35 against the inside surface of the piston housing bottom 22. Piston stem 26 is therefore made to move longitudinally outward from its housing through the hole 23 thereof, with groove 31 riding on the pin 33. Consequently, the connecting coupler 80, fixed to stem 26, carries the clockwork 71 outwardly and away from the piston housing 20, and by means of cap 60, the drum assembly 50 is likewise moved outwardly, and away from the collar 38. Since rim 42 is no longer gripped on the surface 41, the clockwork drive becomes effective to rotate its mechanism and support about its spindle 72, in the manner hereinbefore explained. As was previously noted, the rotating clockwork mechanism carries cap 60 to rotate therewith about piston stem 26, and the cap in turn carries the recording drum 51 and the chart 52 thereon to rotate past the fixed stylus means 73. As a result the rotating drum assembly and the chart thereon which are also moved longitudinally in accordance with water pressure, cause the points comprising the curve traced by the stylus to indicate the water pressure and therefore the depth directly related thereto, at each point in time starting from the time the instrument enters the water.

Thus, it is now clear that a proper location for the collar 38 upon the piston housing 20, is at a point thereon which will allow the coil spring 35 to effectuate the breaking action preventing drum rotation when no water pressure is sensed, and which will permit a release of such action as soon as a significant water pressure is sensed by the piston assembly 25. Moreover, for any particular instrument, the diameter of the piston 27, and the calibration of the spring 35 may be appropriately selected in accordance with the maximum anticipated depth at which the instrument is to be used. However, the spring 35 selected, which may be suitably calibrated linearly to oppose a specified water pressure, will generally determine the depth range of the instrument.

Although the interaction of the contacting knurled ridges on the surface 40 and rim 42, provides a highly effective breaking against the drum drive and makes available a rugged as well as a sensitive instrument, other gripping and holding elements may be used for the purpose. A narrow ring comprising a thin layer or pad of rubber or similar gripping material attached to the peripheral edge of the surface 40, would also be effective to hold from movement the exposed rim of the recording cylinder 56, provided that the force exerted upon this rim by the spring 35 in initial condition, is of sufficient magnitude for the requirements of the selected material. Manifestly, other changes in structural detail are also possible without departing from the spirit of the instant invention. The cap element 60 may be formed as an integral part of the record cylinder 56, to obtain a light weight instrument. Additional economies in material, and a lighter weight may also be achieved on smaller instruments by mounting the holding bracket 76 for appropriately cut-down stylus support arms 74 and 75, on a suitable flat surface cut into the collar 38, whereby the collar 36 may be eliminated altogether.

Figure 7:
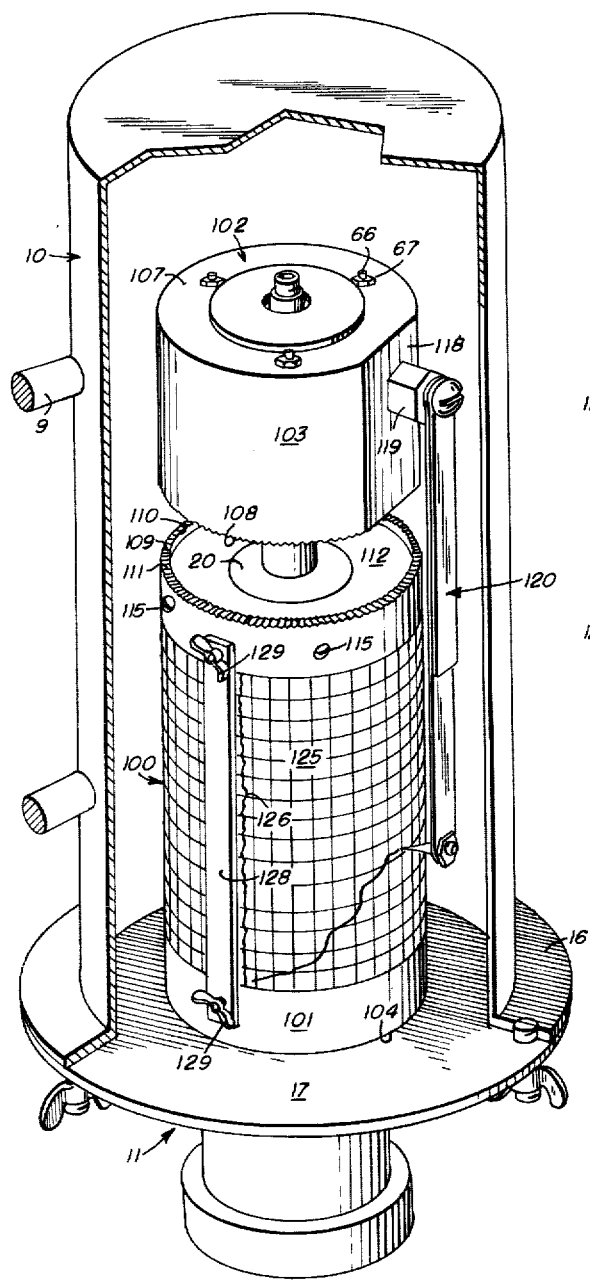
FIG. 7 is a perspective view partly in section, of an instrument in operative condition, embodying a form of the invention comprising an alternative construction for the internal structural arrangement.
Figure 8:
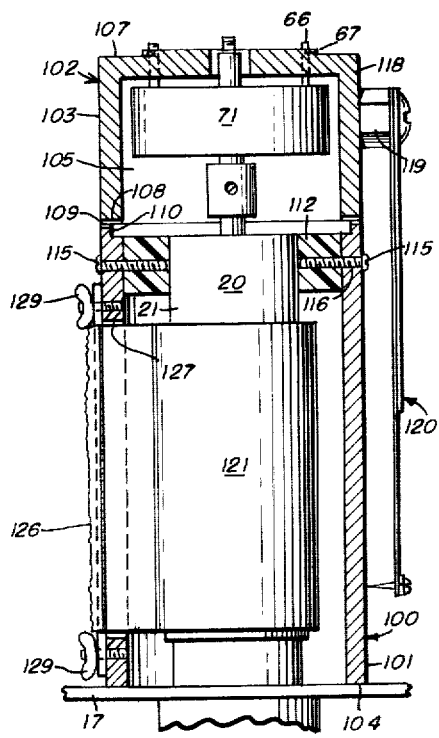
FIG. 8 is a vertical sectional view through an instrument according to the embodiment of FIG. 7.

A further form of the invention illustrated in FIGS. 7 and 8, is distinguished by the simplicity of its construction and the additional convenience of its chart material storage feature. The recording drum 100 shown in these figures is a tubular element comprising a relatively thin-walled cylindrical shell 101. A clockwork mechanism assembly 102, is shown as a distinct element physically separable from the drum. Assembly 102 comprises a cap-like enclosure 103, composed of a cylindrical shell 106, and a top end closure 107 made integral therewith, and the conventional clockwork driving mechanism 71, supported within the chamber 105, defined by the enclosure. Clockwork mechanism 71 is fastened to the top closure 107 by threaded elements 66 and 67 in the same manner as was explained previously in connection with the embodiment of FIGS. 1 and 2. A rim of uniform thickness defining the open end of shell 106, is formed as a ring of knurled ridges 108, which are adapted to cooperate with a similar ring of complementary knurled ridges 111, formed upon the upper rim 109 of the recording drum 100. Rim 109, like the knurled rim 42 shown in FIG. 2, is reduced to a partial thickness by a counterbore 110 in the material of the shell 101 defining the upper opening of the recording drum. A plastic or aluminum spacer ring 112, of suitable thickness and width, having the upper surface thereof set flush with the lower rim of counterbore 110 locates the drum 100 concentric with, but spaced from the piston housing 20, and places the lower rim 104 of the drum solidly in contact with the inside surface of the cover disk 17. By this means the cylindrical shell 101 is erected as an encompassing wall about the piston housing, whereby a space enclosed between this wall and the housing is available to store chart material in a manner to be hereinafter more fully explained. A connection joining the recording drum to the piston housing is made by a number of set screws 115 received in an equal number of holes evenly spaced about the drum shell 101. As shown in FIG. 8, screws 115 traverse passages extending radially through the spacer ring 112, and engage screw threads provided in holes appropriately spaced around the wall 21 of the piston housing 20.

A plane surface 118 established on the outer wall of cylindrical shell 106, has joined thereto a record making assembly 120, by means of an intermediate hexagonal nut connector 119. Assembly 120 comprises a stylus device and support arms therefor, having a form and arrangement substantially like that disclosed as elements 73 to 75, 77 and 78 of the embodiment shown in FIGS. 1 and 2. However, as is evident in the showing of FIGS. 7 and 8, the record making means 120 extends downward from the cap 103, whereby its stylus acts first upon that end of a chart 125 fixed to the drum, nearest to the drum's lower rim 104.

Since the chart 125 is maintained fixed relative to the piston housing 20, in the instant form of the invention, the space between the shell 101 and this housing may be utilized to conveniently store chart materials as was previously noted. An unbroken length of the chart material is stored as a coil or roll 121, about the piston housing, and the leading edge 126 of this roll of material is brought outside the drum 100 through a longitudinal slot 127 cut into the drum shell 101. Chart material sufficient to wrap once around the drum is withdrawn from the supply within the drum, and fastened snugly upon the surface thereof by a clamp bar 128. A proper securing of the chart on the drum requires that some material adjacent the leading edge 126 of a chart wrapped about the drum, overlap and cover the slot 127. As indicated in FIG. 8, the bar 128 may thereafter be clamped down on the overlapped material by means of wing screws 129 engaged in threaded holes in the drum shell 101, adjacent the rims thereof. To replace any chart previously secured to the recording drum 100, the clamp bar 128 is loosened by a few turns of the wing screws 129, and the leading edge 126 is made free to be drawn out and away from the drum until new chart material is wrapped completely around the drum. Following this step the clamp bar is once again secured in place by tightening the wing screws, and the previous chart may be removed by merely tearing the material along an edge of the clamp bar.

Operation of the FIGS. 7 and 8 embodiment is the same as that previously explained for the first embodiment described, with the exception that only the cap element 103, and the various parts attached thereto, are rotatively and longitudinally displaced when the instrument is made operative to record. In a starting or unoperated condition, when no significant pressure is sensed by the piston assembly 25, the driving mechanism 71 of the clockwork assembly is held immobile due to the braking action of the ridges on the rims 108 and 109 held engaged by the pressure of spring 35 of the piston assembly. A disengagement of the braking rims by reason of a longitudinal displacement of the piston and clockwork mechanism assemblies, releases the clockwork mechanism 71 to freely operate as a drive to rotate the cap-like element 103. As a result, the record making means 120 attached to element 103, is operative to make a record by moving across and along the chart 125 fastened to the stationary drum 100.

A study of FIG. 5 reveals two curves A and B, each relating underwater time in minutes to depth in feet. The curves represent the displacement of an instrument which was located near half-net, for two different sets made under different circumstances, and show the variation in depth caused by wind and current acting on the boat and net. Curve A indicates the depth reached by the leadline on a day when the wind and current were tending to drive the boat and net apart, the net reaching a depth of 160 feet (26½ fathoms). The curve B is indicative of a set made later when the boat drifted into the net allowing the leadline to sink some 50 feet deeper to a depth of 210 feet (35 fathoms).

Turning to FIG. 6, there is found a curve made by an instrument fastened to the leadline five rings from the hauling end of the net, showing a gradual sinking as the net is pursed. Knowledge of this relatively long sinking time of the net is important to determine the "lead" necessary when the fish are moving. For example, assuming that a school of fish is moving at 3 knots, or about 100 yards per minute, and also that a bathythermograph trace has been taken showing the thermocline to be well developed at 125 feet. To calculate the amount of "lead" necessary to allow the leadline to reach the thermocline before the fish reach the net, there is added to the known average time it takes to set half the net, namely about 1½ minutes, the time it takes the leadline at the center part of the net to reach a depth of 125 feet, determined from FIG. 5, to be about 4½ minutes. The sum of these two times gives a required lead of 6 minutes during which the fish will travel over a quarter of a mile. This simple calculation does not take into account the distance through the water that the fish can see the net, and in clear water, the lead would probably have to be increased.

While a preferred embodiment of the invention has been illustrated and described herein, it is to be understood that the invention is not limited thereby, but is susceptible of changes in form and detail.

What is claimed is:

1. A pressure sensitive instrument for recording depth as a function of pressure with respect to time, comprising a housing, a closure for said housing having a plurality of openings therein, a movable means displaceable within said housing from a normal to operated positions away from said opening, means tensioned within said housing tending to displace said movable means toward its normal position within the housing, an integral part of said movable means extending outside said housing having means attached thereto uniformly rotatable in accordance with time, record material holding means connected to said rotatable means to rotate therewith, a record making means fixed to said housing, and cooperating with a record material on said record holding means when the latter rotates to make a recording corresponding to the displacement of the movable means in said housing with respect to the rotation of said rotatable means, and further means fixed to said housing being effective to prevent rotation of the rotatable means when the movable means is in normal position within the housing.

2. A pressure responsive recording instrument comprising a housing, a closure for said housing having a plurality of openings therein, a piston means displaceable within said housing, and having as integral parts thereof a head, and a stem extending out of said housing, biasing means between said piston head and a surface of said housing thrusting said piston toward said openings of said closure to a normal position, first means fixed to said housing and coacting with said piston stem to limit movement thereof to longitudinal displacement relative to said normal position, rotation driving means having a part thereof fixed to said piston stem extended, and a part rotatable relative to its fixed part, attached to a record material transport means, second means fixed to said housing having attached thereto a record making means in position to operate upon a record material on said transport means, a third means fixed to said housing having a surface thereon effective to brake the movement of the part rotatable and the record transport means joined therewith, when said piston is in normal position and a surface of said transport means contacts said braking surface, said piston head being responsive to pressure to further extend said stem out of said housing and to displace the said transport means from the braking surface, whereby a rotation and longitudinal displacement of the record transport means causes operation of the record making means.

3. A pressure recording instrument comprising a container assembly including a receptacle means having an opening at one end sealed by a closure therefor comprising a disk and an O-ring gasket between said disk and receptacle, a housing supported in said disk to be suspended within said receptacle, a cap having a plurality of holes closing an opening in said housing outside of said receptacle, a displaceable means within said housing, and means biasing said displaceable means toward said plurality of openings to a normal position, an integral part of said displaceable means extending out of said housing and into space within the receptacle, a clockwork drive on said extended integral part, a record material holding means connected to be rotatively driven by said clockwork, a record making means fixed to said housing, and cooperating with a record material on said holding means when the latter rotates to make a record corresponding to the travel of the displaceable means in said housing with respect to the rotation of said clockwork, and further means fixed to said housing being effective to prevent rotation of the clockwork and record holding means when the displaceable means is in normal position within the housing.

4. A recording instrument operatively responsive to variations in pressure underwater to make a trace on a graphical chart relating depth under water as a function of pressure in respect to time, comprising a receptacle assembly including a container means, a housing supported in said container assembly to be suspended within said container, a displaceable means within said housing having a part thereof extending out of said housing and within the said container, a rotation drive means fixed to said extending part, a sleeve element concentric about and spaced from the said housing, and attached to the rotation drive means to rotate therewith, the graphical chart being fastened to said rotatable sleeve, a trace making means fixed to said housing, and cooperating with the graphical chart on said holding means when the latter rotates, to make a trace corresponding to the travel of the displaceable means in said housing with respect to the rotation of the drive means, and further means fixed to said housing being operatively effective to prevent rotation of the rotation drive means and the sleeve when the displaceable means is at one extreme of its normal displacement.

5. The recording instrument of claim 4, wherein the receptacle assembly also includes a closure disk for said container means, an O-ring gasket seated between the container means and the closure disk, and fastening means on said container and disk facilitating their jointure on the O-ring whereby the interior of the container is sealed from the entry of water when the instrument is underwater.

6. The recording instrument of claim 4, wherein the receptacle assembly also includes a closure cap, threads on said cap and container facilitating their engagement to seal the container from the entry of water when the instrument is underwater.

7. A pressure sensitive recording instrument comprising a receptacle assembly including a container and a closure means therefor, the latter comprising a sleeve flange, and an O-ring gasket seated between the said flange and the container, said flange sleeve extending away from the container and having fixed therein a housing suspended therefrom to extend into the container, a cap having a plurality of holes, attached to said sleeve to cover an opening in said housing, a piston assembly including a cylindrical head having O-ring gaskets seated in circumferential grooves thereof to seal the head against the housing wall, and a stem extending out through the housing within the container, a coil spring between the piston head and a housing wall, biasing the piston assembly toward said plurality of holes to a normal position, a clockwork fixed to said stem and rotatably driven relative thereto, a cap-like element comprising an enclosing wall and flat surface, said clockwork being attached to said flat surface, a tubular element attached to said wall and extending longitudinally over said housing and concentric therewith, a record material secured to said tubular element, a tracing point fixed to said housing, and in position for making said record material, a brake means fixed to said housing and operable to coact with a surface on the tubular element, to overcome the clockwork drive thereto through the cap-like element, and prevent rotation of the clockwork and the tubular element when the piston is in normal position.

8. A pressure sensitive recording instrument comprising a receptacle assembly including a cylindrical container having a handle on its outer wall, and a closure element covering over an opening at one end of the container, a housing fixed in said closure element having operable therein a pressure detecting apparatus including a member displaceable in said housing from an initial position to other positions corresponding to the pressures detected, a portion of said member passing through an opening in said housing and extending into the container, a clockwork attached to the said portion of the member, a recording mechanism having as a part thereof a record material carrier attached to said clockwork and rotatable therewith relative to the displaceable member, and as another part thereof a record making means fixed to said housing to cooperate with a record material on said carrier to produce a record indicative of the pressures detected with respect to time, and further means fixed to said housing to brake the rotation of the clockwork and the record carrier connected thereto when the displaceable member is in its initial position in the housing.

9. The pressure sensitive recording instrument of claim 8, wherein the closure element comprises a sleeve-flange, and the said housing comprises a hollow cylindrical member having one end fixed in said sleeve whereby its other end is suspended from the flange into the container, and wherein said displaceable member is a piston having a head with O-rings seated therein to seal it to the wall of the housing, and the said portion of the member being an extension of a stem from the head, passing into the container through an opening in the said other end of the housing.

10. The pressure sensitive recording instrument of claim 8, wherein the record making means is a stylus element attached to a flexible arm, and a collar fixed to said housing supports the said arm to position the stylus element to cooperate with the record material on the carrier.

11. The pressure sensitive recording instrument of claim 8, wherein the said further means fixed to the housing to brake rotation, is a collar having formed thereon a surface of gripping material adapted to firmly contact a surface on the record material carrier when the displaceable member is in its initial position in the housing.

12. A pressure responsive recording instrument comprising a housing, a closure for said housing having a plurality of openings therein, a piston means displaceable within said housing, and having as integral parts thereof a head, and a stem extending out of said housing, biasing means between said piston head and a surface of said housing thrusting said piston toward said openings of said closure to a normal position, first means fixed to said housing and coacting with said piston stem to limit movement thereof to longitudinal displacement relative to said normal position, rotation driving means having a part thereof fixed to said piston stem extended, a recording arrangement comprising a movable part and a stationary part, second means connected to rotate with said rotation driving means, and operable to displace the movable part of the recording arrangement relative to the stationary part thereof, to make a recording corresponding to the displacement of the piston means within said housing with respect to the rotation of the said rotation driving means, and further means operatively associated with said recording arrangement, being effective to prevent rotation of the rotation driving means when the said piston means is in normal position within the housing.

13. A pressure sensitive instrument for recording depth as a function of pressure with respect to time, comprising a housing, a closure for said housing having a plurality of openings therein, a movable means displaceable within said housing from a normal to operated positions away from said opening, means tensioned within said housing tending to displace said movable means toward its normal position within the housing, an integral part of said movable means extending outside said housing having means attached thereto uniformly rotatable in accordance with time, a recording means comprising a first part having secured thereto material adapted to receive a record, said first part being supported in nested relationship with said housing, and a second part adapted to make a record, said second part being supported in position relative to said first part to cooperate therewith to record upon said record material, means connected to rotate with said means rotatable, and operable to displace one part of the recording means relative to the other to make a recording corresponding to the displacement of the movable means within said housing with respect to the rotation of said rotatable means, and further means operatively associated with said recording means, being effective to prevent rotation of the means rotatable when the said movable means is in normal position within the housing.

14. The recording instrument of claim 13, wherein the said further means comprises respective braking surfaces on said first and second parts of the recording means which are adapted to contact and engage to prevent rotation of the means rotatable when the movable means is in normal position within the housing.

15. The recording instrument of claim 13, wherein connecting elements join the said first part of the recording means to the housing and the means connected to rotate with the said means rotatable, is operable to displace the said second part of the recording means relative to the said first part thereof.

16. The recording instrument of claim 15, wherein said connecting elements comprise a spacer means maintaining the said first part of the recording means spatially disposed from the said housing to achieve its nested relationship with respect thereto, and defining therebetween a uniformly distributed hollow interspace.

17. The recording instrument of claim 16, wherein said first part of the recording means is formed with an opening therein, a supply of said material receiving a record supported within said interspace, a portion of said supply of material being brought out through said opening in said first part and wrapped thereabout, and clamp means fastened to the said first part to secure thereto the said portion of the material brought out through the said opening therein.

No references cited.

UNITED STATES PATENT OFFICE
CERTIFICATE OF CORRECTION

Patent No. 3,104,928                    September 24, 1963

Frank J. Hester

It is hereby certified that error appears in the above numbered patent requiring correction and that the said Letters Patent should read as corrected below.

In the heading to the drawings, Sheets 1 to 3, line 2, and in the heading to the printed specification, line 2, title of invention, for "BATHKYMOGRAPH", each occurrence, read -- BATHYKYMOGRAPH --.

Signed and sealed this 14th day of April 1964.

(SEAL)
Attest:
ERNEST W. SWIDER

Attesting Officer

EDWARD J. BRENNER

Commissioner of Patents